US012583514B2

(12) United States Patent
Kim

(10) Patent No.: US 12,583,514 B2
(45) Date of Patent: Mar. 24, 2026

(54) FOUR-WHEEL STEERING CONTROL DEVICE AND METHOD

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 901 days.

(21) Appl. No.: 17/817,327

(22) Filed: Aug. 3, 2022

(65) Prior Publication Data

US 2023/0056227 A1     Feb. 23, 2023

(30) Foreign Application Priority Data

Aug. 23, 2021     (KR) ........................ 10-2021-0110899

(51) Int. Cl.
B62D 7/15          (2006.01)
(52) U.S. Cl.
CPC ........... B62D 7/159 (2013.01); B62D 7/1545 (2013.01)
(58) Field of Classification Search
CPC ........ B62D 6/002; B62D 7/14; B62D 7/1509; B62D 7/1545; B62D 7/159
See application file for complete search history.

(56) References Cited

U.S. PATENT DOCUMENTS

| | | | | |
|---|---|---|---|---|
| 4,943,758 A | * | 7/1990 | Tsurumiya ........... | B62D 7/1581 |
| | | | | 318/504 |
| 5,267,160 A | * | 11/1993 | Ito ............................ | B62D 6/02 |
| | | | | 701/42 |
| 11,975,775 B2 | * | 5/2024 | Sakayori .............. | B62D 7/1509 |
| 2011/0224872 A1 | * | 9/2011 | Reed ...................... | B62D 6/002 |
| | | | | 701/41 |
| 2012/0065842 A1 | * | 3/2012 | Ghoneim ............... | B62D 7/159 |
| | | | | 701/42 |
| 2015/0191199 A1 | * | 7/2015 | Tsubaki .............. | B62D 5/0463 |
| | | | | 701/42 |
| 2015/0246684 A1 | * | 9/2015 | Ahern .................. | B62D 5/0457 |
| | | | | 182/69.5 |
| 2023/0234438 A1 | * | 7/2023 | Lee .......................... | B60G 3/20 |
| | | | | 180/6.48 |
| 2025/0187657 A1 | * | 6/2025 | Kim ...................... | B62D 6/008 |

FOREIGN PATENT DOCUMENTS

KR          20210084962 A  *  7/2021   ............. B63H 25/38

* cited by examiner

*Primary Examiner* — Carl C Staubach
(74) *Attorney, Agent, or Firm* — DLA PIPER LLP US

(57)          ABSTRACT

A four-wheel steering control device for independently controlling steering of each of first to fourth wheels disposed in a vehicle. A commanded steering angle acquiring part acquires first to fourth commanded steering angles for first to fourth wheels of a vehicle. A four-wheel turning control rate calculating part determines first to fourth residual angles, by which the first to fourth wheels realize the first to fourth commanded steering angles, from current steering angles and calculate first to fourth turning control rates of the first to fourth wheels on basis of the first to fourth residual angles determined. A control part independently controls steering of each of the first to fourth wheels using the first to fourth turning control rates calculated.

4 Claims, 3 Drawing Sheets

Figure 1:
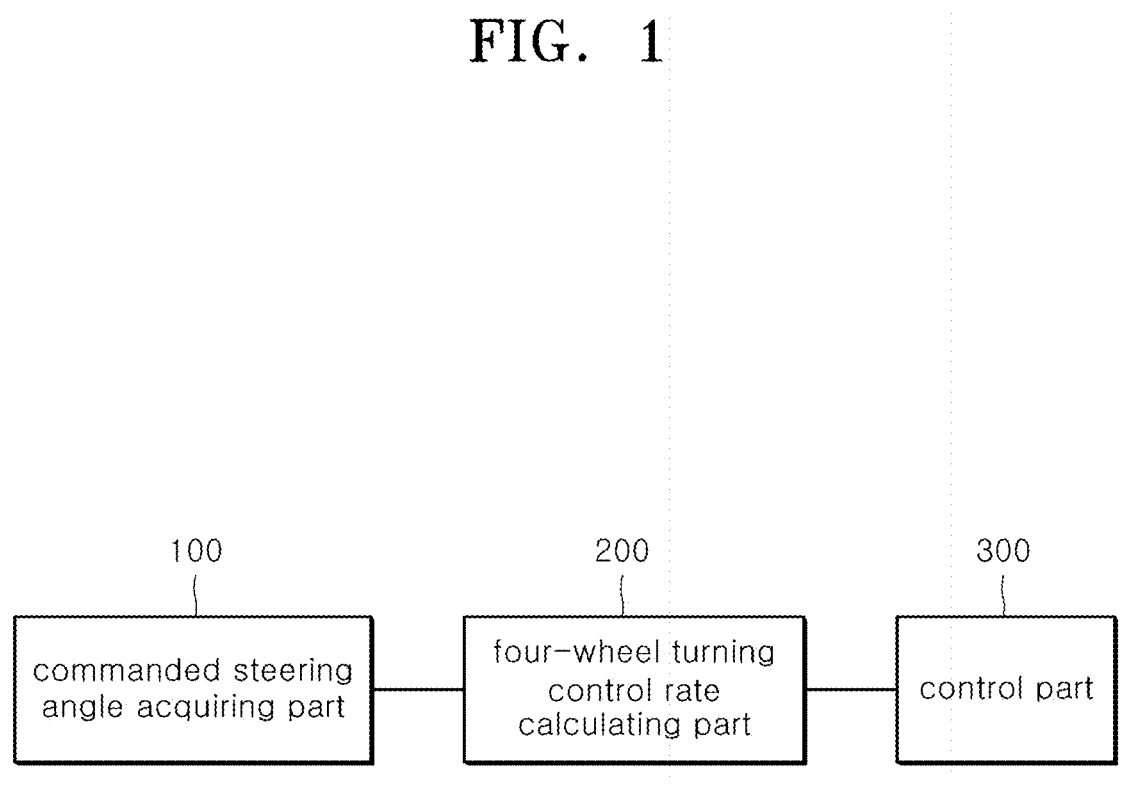

┌──────────────────┐   ┌──────────────────┐   ┌──────────────────┐
│commanded steering│   │ four-wheel turning│   │                  │
│angle acquiring part│──│   control rate   │──│   control part   │
│                  │   │ calculating part │   │                  │
└──────────────────┘   └──────────────────┘   └──────────────────┘
```

FOUR-WHEEL STEERING CONTROL DEVICE AND METHOD

CROSS-REFERENCE TO RELATED APPLICATION

This application claims priority from and the benefit of Korean Patent Application No. 10-2021-0110899, filed on Aug. 23, 2021, which is hereby incorporated by reference for all purposes as if set forth herein.

BACKGROUND

Field

Exemplary embodiments of the present disclosure relate to a four-wheel steering control device and method, and more particularly, to a four-wheel steering control device and method for independently controlling the steering of each of four wheels.

Discussion of the Background

An active front steering (AFS) system used in a vehicle includes a variable steering gear ratio device between the steering wheel and a steering actuator. The AFS system outputs a changed turning angle to an AFS actuator by receiving a steering angle of the steering wheel and changes the steering gear ratio, thereby providing front wheel steering responsiveness and driving stability. In addition, a rear wheel steering (RWS) system determines rear wheel angles by receiving a steering angle of the steering wheel, a vehicle speed, and the like and controls the rear wheel angles by driving a RWS actuator, thereby providing rear wheel steering responsiveness and driving stability.

Recently, a technology for independently controlling the steering of each of four wheels of a vehicle has been researched in order to obtain a greater degree of freedom of driving of a vehicle in, e.g., parallel movements (e.g., parallel parking), diagonal movements (e.g., diagonal parking), or neutral steering. Two-wheel steering (or front-wheel steering) is performed using two front wheels mechanically connected to each other through the Ackerman geometry model. In contrast, in four-wheel steering, four wheels are not mechanically connected to each other, and thus the angle of each of the four wheels should be independently controlled.

In the related art, a steering system is designed such that, when commanded steering angles for wheels are input, each of the wheels follows a corresponding commanded steering angle. However, residual angles of the wheels, by which the current steering angles of the wheels (i.e., wheel angles) realize the commanded steering angles, may be different from each other. Thus, in a situation in which the wheels directly follow the commanded steering angles, when the vehicle is to move, ideal steering angles of the wheels may not be formed. Consequently, there may be problems in that the vehicle may not be able to move on a target movement route, and driving stability may be impaired due to wheel drag, vibrations, and the like.

SUMMARY

The present disclosure has been made in an effort to solve the above-described problems and an objective of the present disclosure is to provide a four-wheel steering control device and method used in a four-wheel steering apparatus independently controlling the steering of each of four wheels and configured to prevent abnormal driving, wheel drag, and vibrations in a vehicle caused by the wheels directly following commanded steering angles, thereby improving the driving stability of the vehicle.

In an embodiment, provided is a four-wheel steering control device for independently controlling steering of each of first to fourth wheels disposed in a vehicle. The four-wheel steering control device may include: a commanded steering angle acquiring part acquiring first to fourth commanded steering angles for first to fourth wheels of a vehicle; a four-wheel turning control rate calculating part determining first to fourth residual angles, by which the first to fourth wheels realize the first to fourth commanded steering angles, from current steering angles and calculate first to fourth turning control rates of the first to fourth wheels on basis of the first to fourth residual angles determined; and a control part independently controlling steering of each of the first to fourth wheels using the first to fourth turning control rates calculated.

In an embodiment, the four-wheel turning control rate calculating part may calculate the first to fourth turning control rates by which steering angles of the first to fourth wheels simultaneously realize the first to fourth commanded steering angles.

In an embodiment, the four-wheel turning control rate calculating part may specify the first wheel having a minimum residual angle among the first to fourth wheels and, subsequently, calculate the second to fourth turning control rates of the second to fourth wheels on basis of the first turning control rate of the first wheel.

In an embodiment, the four-wheel turning control rate calculating part may calculate the first turning control rate of the first wheel by applying the first residual angle of the first wheel to predetermined mapping information between the residual angles and the turning control rates and calculate the second to fourth turning control rates of the second to fourth wheels so that a time taken for the steering angle of the first wheel to realize the first commanded steering angle is the same as each of the times taken for the steering angles of the second to fourth wheels to realize the second to fourth commanded steering angles.

In an embodiment, provided is a four-wheel steering control method of independently controlling steering of each of first to fourth wheels disposed in a vehicle. The four-wheel steering control method may include: acquiring, by a commanded steering angle acquiring part, first to fourth commanded steering angles of first to fourth wheels; determining, by a four-wheel turning control rate calculating part, first to fourth residual angles, by which the first to fourth wheels reach the first to fourth commanded steering angles, from current steering angles and calculating first to fourth turning control rates of the first to fourth wheels on basis of the first to fourth residual angles determined; and independently controlling, by a control part, steering of each of the first to fourth wheels using the first to fourth turning control rates calculated.

According to an aspect of the present disclosure, the four-wheel steering control device for independently controlling the steering of each of the four wheels can control the steering angles of the wheels to realize the commanded steering angles at the same time by differentially controlling the turning control rates of the wheels. In this manner, it is possible to prevent abnormal driving, wheel drag, and vibrations in a vehicle, thereby removing the sensation of variations in driving and improving the driving stability of the vehicle.

BRIEF DESCRIPTION OF THE DRAWINGS

FIG. 1 is a block diagram illustrating the configuration of a four-wheel steering control device according to embodiments of the present disclosure;

DETAILED DESCRIPTION OF THE ILLUSTRATED EMBODIMENTS

Figure 2:
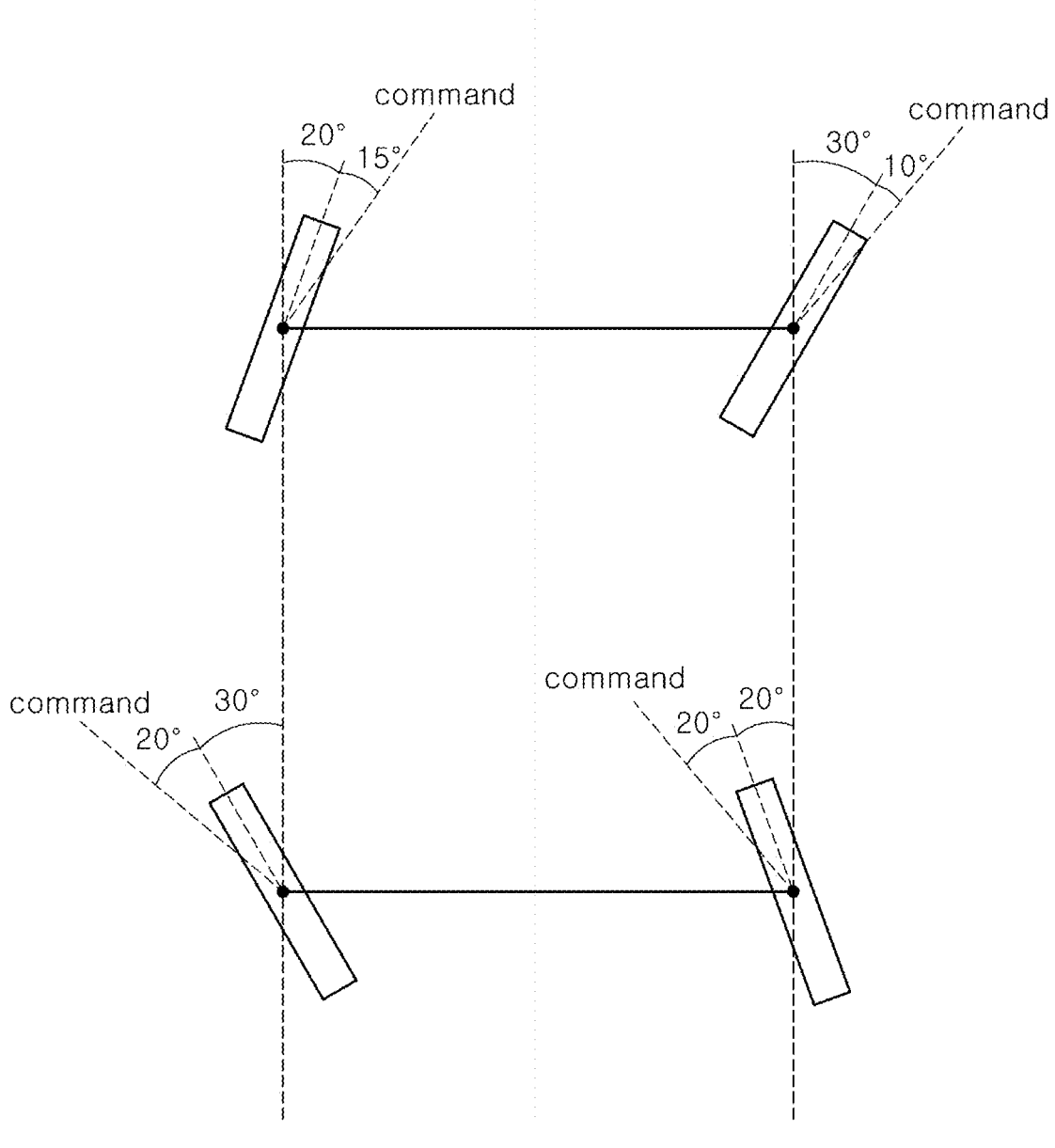
FIG. 2 is an example view illustrating a process of calculating first to fourth turning control rates of the first to fourth wheels in the four-wheel steering control device according to embodiments of the present disclosure.

Hereinafter, a four-wheel steering control device and method will be described with reference to the accompanying drawings through various exemplary embodiments. In this process, thicknesses of lines in the drawings and sizes of constituent elements may be exaggerated for clarity and convenience. Further, the following terms are defined, considering functions thereof in the present invention, and may be varied according to intentions and customs of a user or an operator. Therefore, the terms should be defined on the basis of the contents of the entire specification.

Figure 3:
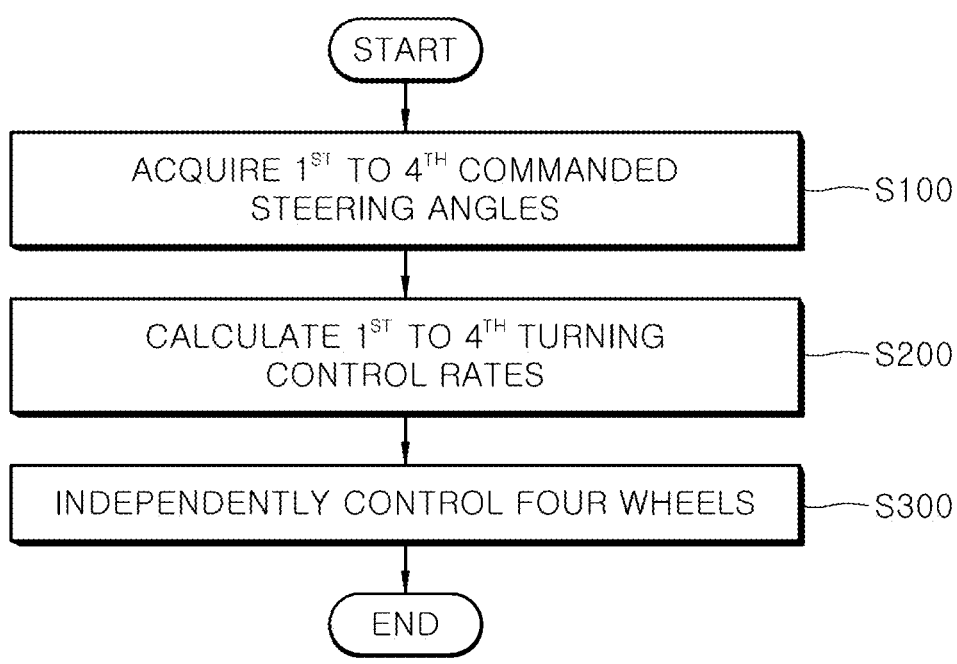
FIG. 3 is a flowchart illustrating a four-wheel steering control method according to embodiments of the present disclosure.

FIG. 1 is a block diagram illustrating the configuration of a four-wheel steering control device according to embodiments of the present disclosure, FIG. 2 is an example view illustrating a process of calculating first to fourth turning control rates of the first to fourth wheels in the four-wheel steering control device according to embodiments of the present disclosure, and FIG. 3 is a flowchart illustrating a four-wheel steering control method according to embodiments of the present disclosure.

Referring to FIG. 1, the four-wheel steering control device according to embodiments may include a commanded steering angle acquiring part 100, a four-wheel turning control rate calculating part 200, and a control part 300.

The commanded steering angle acquiring part 100 may acquire first to fourth commanded steering angles for the first to fourth wheels of the vehicle. For example, the commanded steering angle acquiring part 100 may acquire the first to fourth commanded steering angles by calculating a commanded front wheel angle by applying a total gear ratio (TGR) of a variable steering gear ratio device to a steering angle produced by a driver operating the steering wheel or a commanded steering angle input by an advanced driver assistance system (ADAS) and then applying a predetermined commanded steering angle calculation algorithm to the commanded front wheel angle calculated.

The four-wheel turning control rate calculating part 200 may calculate the first to fourth turning control rates of the first to fourth wheels by which the steering angles of the first to fourth wheels will simultaneously realize the first to fourth commanded steering angles. Specifically, the four-wheel turning control rate calculating part 200 may determine first to fourth residual angles, by which the first to fourth wheels will realize the first to fourth commanded steering angles, from current steering angles and calculate the first to fourth turning control rates of the first to fourth wheels on the basis of the first to fourth residual angles determined.

In this regard, the four-wheel turning control rate calculating part 200 may operate to specify the first wheel having a minimum residual angle among the first to fourth wheels and, subsequently, calculate the second to fourth turning control rates of the second to fourth wheels on the basis of the first turning control rate of the first wheel.

FIG. 2 illustrates an example in which the current steering angles of the first to fourth wheels are 30°, 20°, −30°, and −20°, respectively. In this position, when the first to fourth commanded turning angles are 40°, 35°, −50°, and −40°, respectively, the first to fourth residual angles are 10°, 15°, 20°, and 20°, respectively. The four-wheel turning control rate calculating part 200 specifies the first wheel having the minimum residual angle.

Afterwards, the four-wheel turning control rate calculating part 200 may calculate the first turning control rate of the first wheel by applying the first residual angle of the first wheel to predetermined mapping information between the residual angles and the turning control rates. The mapping information may be previously set in the four-wheel turning control rate calculating part 200 on the basis of the specification of the vehicle and the pre-experiment result of the designer as relationship information between the residual angle and the turning control rate. In the above illustration, the four-wheel turning control rate calculating part 200 may extract a first turning rate of 5 deg/s matching the first residual angle 10° from the mapping information.

Subsequently, the four-wheel turning control rate calculating part 200 may calculate the remaining second to fourth turning control rates of the second to fourth wheels on the basis of the first turning control rate calculated. Specifically, the four-wheel turning control rate calculating part 200 may calculate the second to fourth turning control rates of the second to fourth wheels so that times taken for the steering angles of the second to fourth wheels to realize the second to fourth commanded steering angles are the same.

In the above illustration, the time taken for the steering angle of the first wheel to realize the first commanded steering angle may be calculated as two seconds. The four-wheel turning control rate calculating part 200 may calculate the second to fourth turning control rates so that the steering angles of the second to fourth wheels realize the second to fourth commanded steering angles after two seconds. That is, since the second to fourth residual angles are 15°, 20°, and 20°, respectively, the second to fourth turning control rates by which the steering angles of the second to fourth wheels will realize the second to fourth commanded steering angles, respectively, after two seconds are 7.5 deg/s, 10 deg/s, and 10 deg/s, respectively.

Although the first to fourth commanded steering angles have been described as being different above, the same may apply when the first to fourth commanded steering angles are the same. In the illustration of FIG. 2, when each of the first to fourth commanded turning angles is 90° (e.g., a parallel parking mode), the first to fourth residual angles are 60°, 70°, 120°, and 110°, respectively. When the first turning control rate mapped to the minimum first residual angle 60° is 20 deg/s, the second to fourth turning control rates may be calculated 23.3 deg/s, 40 deg/s, and 36.7 deg/s, respectively, so that the steering angles of the second to fourth wheels realize the second to fourth commanded steering angles after three seconds.

When the first to fourth turning control rates are calculated as above by the four-wheel turning control rate calculating part 200, the control part 300 may independently control the steering of each of the first to fourth wheels using the first to fourth turning control rates.

FIG. 3 is a flowchart illustrating a four-wheel steering control method according to embodiments of the present disclosure. With reference to FIG. 3, the four-wheel steering control method according to embodiments will be described mainly with regard to the time-sequence configuration thereof by omitting detailed descriptions of the portions substantially the same as the above-described portions.

First, in S100, the commanded steering angle acquiring part 100 acquires the first to fourth commanded steering angles of the first to fourth wheels.

Afterwards, the four-wheel turning control rate calculating part 200 determines the first to fourth residual angles, by which the first to fourth wheels will reach the first to fourth commanded steering angles, from the current steering angles, and calculates the first to fourth turning control rates of the first to fourth wheels on the basis of the first to fourth residual angles determined. In S200, the four-wheel turning control rate calculating part 200 calculates the first to fourth turning control rates by which the steering angles of the first to fourth wheels will simultaneously realize the first to fourth commanded steering angles.

In the same manner as calculating the first to fourth turning control rates, the four-wheel turning control rate calculating part 200 specifies the first wheel having the minimum residual angle among the first to fourth wheels and, subsequently, the remaining second to fourth turning control rates of the second to fourth wheels on the basis of the first turning control rate of the first wheel. In this case, the four-wheel turning control rate calculating part 200 calculates the first turning control rate of the first wheel by applying the first residual angle of the first wheel to the predetermined mapping information between the residual angles and the turning control rates and calculates the second to fourth turning control rates of the second to fourth wheels so that the time taken for the steering angle of the first wheel to realize the first commanded steering angle is the same as each of the times taken for the steering angles of the second to fourth wheels to realize the second to fourth commanded steering angles.

Subsequently, in S300, the control part 300 independently controls the steering of each of the first to fourth wheels using the first to fourth turning control rates calculated in S200.

As described above, in the foregoing embodiments, the four-wheel steering control device for independently controlling the steering of each of the four wheels can control the steering angles of the wheels to realize the commanded steering angles at the same time by differentially controlling the turning control rates of the wheels. In this manner, it is possible to prevent abnormal driving, wheel drag, and vibrations in a vehicle, thereby removing the sensation of variations in driving and improving the driving stability of the vehicle.

The term "part" used herein may refer to, for example, a unit comprised of at least one of hardware, software, and firmware. The part may be interchangeable with a term, such as "logic," "logical block," "component," "circuit," or the like. The part may be a unitary component or a minimum unit or a part of the unitary component performing one or more functions. For example, the part may be implemented as an application-specific integrated circuit (ASIC). In addition, the implementations described herein may be embodied as, for example, a method, a process, a device, a software program, a data stream, or signals. Even in the case in which the present disclosure has been discussed in the context of a single form of implementation (e.g., only discussed as a method), the discussed features may also be realized in another form (e.g., a device or a program). The device may be implemented as a suitable form, such as hardware, software, or firmware. The method may be realized in a device, such as a processor, typically referred to as a processing device including, for example, a computer, a microprocessor, an integrated circuit, a programmable logic device, or the like. The processor may also include a computer, a cellular phone, a personal digital assistant (PDA), and other communication devices facilitating information communication between final users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A four-wheel steering control device for independently controlling steering of each of first to fourth wheels disposed in a vehicle, the four-wheel steering control device comprising:

a commanded steering angle acquiring part adapted to acquire first to fourth commanded steering angles for the first to fourth wheels, the first to fourth commanded steering angles being configured to be independent from each other;

a four-wheel turning control rate calculating part adapted to determine first to fourth residual angles, by which the first to fourth wheels realize the first to fourth commanded steering angles, from current steering angles and calculate, based on the determined first to fourth residual angles, first to fourth turning control rates by which steering angles of the first to fourth wheels simultaneously realize the first to fourth commanded steering angles, respectively, and wherein to calculate the first to fourth turning control rates, the four-wheel turning control rate calculating part is adapted to specify a wheel having a smallest residual angle among the first to fourth wheels as the first wheel and calculate the second to fourth turning control rates of the second to fourth wheels based on the first turning control rate of the first wheel; and a control part adapted to independently control steering of each of the first to fourth wheels using the calculated first to fourth turning control rates, to simultaneously control the first to fourth wheels to realize the first to fourth commanded steering angles, respectively.

2. The four-wheel steering control device according to claim 1, wherein the four-wheel turning control rate calculating part is adapted to calculate the first turning control rate of the first wheel by applying the first residual angle of the first wheel to predetermined mapping information between the residual angles and the turning control rates and calculate the second to fourth turning control rates of the second to fourth wheels so that a time taken for the steering angle of the first wheel to realize the first commanded steering angle is the same as each of the times taken for the steering angles of the second to fourth wheels to realize the second to fourth commanded steering angles.

3. A four-wheel steering control method of independently controlling steering of each of first to fourth wheels disposed in a vehicle, the method comprising:

acquiring, by a commanded steering angle acquiring part, first to fourth commanded steering angles of the first to fourth wheels, the first to fourth commanded steering angles being configured to be independent from each other;

determining, by a four-wheel turning control rate calculating part, first to fourth residual angles, by which the first to fourth wheels reach the first to fourth commanded steering angles, from current steering angles and calculating, based on the first to fourth residual angles determined, first to fourth turning control rates by which steering angles of the first to fourth wheels simultaneously realize the first to fourth commanded steering angles, respectively, wherein in calculating the first to fourth turning control rates, the four-wheel turning control rate calculating part specifies a wheel having a smallest residual angle among the first to fourth wheels as the first wheel and calculate the second to fourth turning control rates of the second to fourth wheels based on the first turning control rate of the first wheel; and independently controlling, by a control part, steering of each of the first to fourth wheels using the calculated first to fourth turning control rates, to control the first to fourth wheels to simultaneously realize the first to fourth commanded steering angles, respectively.

4. The four-wheel steering control method according to claim 3, wherein, in calculating the first to fourth turning control rates, the four-wheel turning control rate calculating part calculates the first turning control rate of the first wheel by applying the first residual angle of the first wheel to predetermined mapping information between the residual angles and the turning control rates and calculates the second to fourth turning control rates of the second to fourth wheels so that a time taken for the steering angle of the first wheel to realize the first commanded steering angle is the same as each of the times taken for the steering angles of the second to fourth wheels to realize the second to fourth commanded steering angles.

\* \* \* \* \*